(12) United States Patent
Garrity et al.

(10) Patent No.: US 7,925,444 B2
(45) Date of Patent: Apr. 12, 2011

(54) SYSTEMS AND METHODS FOR RESOLVING AMBIGUITY BETWEEN NAMES AND ENTITIES

(75) Inventors: George Garrity, Okemos, MI (US); Catherine Lyons, Edinburgh (GB)

(73) Assignee: Board of Trustees of Michigan State University, East Lansing, MI (US)

( * ) Notice: Subject to any disclaimer, the term of this patent is extended or adjusted under 35 U.S.C. 154(b) by 1682 days.

(21) Appl. No.: 10/759,817

(22) Filed: Jan. 16, 2004

(65) Prior Publication Data

US 2005/0160059 A1    Jul. 21, 2005

(51) Int. Cl.
*G06F 7/00* (2006.01)
(52) U.S. Cl. ............... 702/19; 702/20; 703/11; 703/12; 707/700
(58) Field of Classification Search .................... None
See application file for complete search history.

(56) References Cited

U.S. PATENT DOCUMENTS

| | | | |
|---|---|---|---|
| 6,539,396 B1* | 3/2003 | Bowman-Amuah | 707/103 R |
| 2003/0167283 A1* | 9/2003 | Remsen et al. | 707/104.1 |
| 2005/0038776 A1* | 2/2005 | Cyrus et al. | 707/3 |

OTHER PUBLICATIONS

Lilburn et al. ( Int. J of Systematic and Evolutionary Microbiology, 2004, 54:7-13, published online May 9, 2003).*
Cole et al. ( Nucleic acids research 2003, 31:442-443).*
Cornell et al. (Yeast 2003, 20:1291-1306).*
Stewart Dissertation Abstracts International, (2000) vol. 61, No. 9B, p. 4830.*
Theodorakis et al. Int.. J of Cooperative Information Systems (Sep.-Dec. 1997) vol. 6, No. 3-4 pp. 269-292.*

* cited by examiner

*Primary Examiner* — Mary K Zeman
(74) *Attorney, Agent, or Firm* — Medlen & Carroll, LLP

(57) ABSTRACT

The present invention provides systems and methods that utilize an information architecture for disambiguating scientific names and other classification labels and the entities to which those names are applied, as well as a means of accessing data on those entities in a networked environment using persistent, unique identifiers.

26 Claims, 6 Drawing Sheets

SYSTEMS AND METHODS FOR RESOLVING AMBIGUITY BETWEEN NAMES AND ENTITIES

FIELD OF THE INVENTION

The present invention provides systems and methods that utilize an information architecture for disambiguating scientific names and other classification labels and the entities to which those names are applied, as well as a means of accessing data on those entities in a networked environment using persistent, unique identifiers.

BACKGROUND OF THE INVENTION

The simple act of naming an entity (e.g., biological entity) that is part of a large, complex classification or taxonomic system has potentially far-reaching and long-lived consequences. Names, especially those ascribed to organisms, serve as a primary entry point into the scientific, medical, and technical literature and figure prominently in countless laws and regulations governing various aspects of commerce, public safety and public health. Biological names also serve as a primary entry point into many of the central databases that the scientific community and the general public rely on. While legalistic Codes of Nomenclature exists that govern the formation and assignment of names to proposed taxa, the process of biological classification is not governed by any formal mechanism. Taxonomies represent the scientific opinions of the individuals who create them, and may be of varying quality or consistency. Hence, legitimate and valid names may be ascribed to poorly formed taxa and illegitimate and invalid names may be assigned to well-formed and/or correctly identified taxa. Moreover, biological names are neither unique nor permanent. A single organism can bear multiple names (synonyms) that represent differing taxonomic opinions that may have been rendered either in sequence or in parallel. Instances of homonymy also occur, in which a single name may refer to more than one group of organisms that are of markedly different evolutionary lineages (e.g. bacteria and insects). Orthographic variants may also occur, arising from correction of nomenclatural errors.

This disjunction between nomenclature and taxonomy leads to an accumulation of dubious names in the literature and databases. While experts in taxonomy and biological nomenclature may be able to recognize and correctly interpret such circumstances, few others have the requisite skills to do so, resulting in frequent misapplication of names and misinterpretation of the taxonomic record. From a practical, legal, or regulatory sense, either incorrect nomenclature or errors in classification or identification can have significant and unintended consequences. For example, these errors may lead to the addition or removal of biological species to lists of tightly regulated organisms such as those appearing on the CDC list of Restricted Select Agents, those governed by the USDA APHIS program, those covered by the Endangered Species Act, or those restricted by packaging and shipping regulations. The use of biological names as a means of information retrieval is not reliable as these names are neither unique nor persistent.

What is needed is a method of persistently disambiguating the relationship between names and biological taxa, so that information keyed on a given name will be retrievable in the future, across a networked environment, regardless of whether or not that name is still considered applicable by contemporary standards. Such a method should also retrieve all of the information regarding a given organism or group of organisms bearing multiple synonyms and orthographic variations in a single query.

SUMMARY OF THE INVENTION

The present invention provides systems and methods that utilize an information architecture for disambiguating scientific names and other classification labels and the entities to which those names are applied, as well as a means of accessing data on those entities in a networked environment using persistent, unique identifiers.

For example, the present invention provides a method for accessing information and related data on biological taxa or other entities, comprising: providing information objects, creating unique and persistent content identifiers for the information objects, and making the content identifiers accessible through the use of networked resolution services. In a preferred embodiment, the content identifier is a Digital Object Identifier (DOI), a form of Handle. In other embodiments, the content identifier is some other form of a Uniform Resource Identifier (URI) or a Uniform Resource Name (URN), or other functionally analogous identifier. Other identifiers include, but are not limited to, other forms of Handle, Archival Resource Key (ARK), Persistent Uniform Resource Locator (PURL), Universal Unique Identifier (UUID), and Life Sciences Identifier (LSID). In a preferred embodiment, the method is used to access a comprehensive phylogenetic classification of Archaea and Bacteria based on a phylogenetic analysis the 16S ribosomal RNA gene.

In some embodiments, the content of the biological information objects is metadata, data, and descriptive text, representing biological Names, Taxa, and Nomoi. In preferred embodiments, each of these objects contains structured information and is uniquely and persistently addressable and is used in the construction of nomenclatural and taxonomic services. In some embodiments, the content of the information objects is generated and resolved using automated methods of classifying data, employing computer algorithms to assign taxa to groups based on statistical methods or heuristics. In some embodiments, the content of information objects is generated manually by a compilation of the published taxonomic record. In some embodiments, content of the information objects is generated using a combination of manual and automated methods. In some embodiments, Taxon objects exist that are not referenced by Name objects.

In some embodiments, the data comprises biological data (e.g., information pertaining to an organism identity, patient information, biometric data, sociological characteristics of an organism, etc.). In some embodiments, the data comprises non-biological scientific data (e.g., data corresponding to properties of materials, chemicals, drugs, celestial bodies, etc.). In some embodiments, the data comprises financial data (e.g., characteristics of a company, traded security, etc.). Indeed, the present invention is not limited to any particular type of data and may be applied to any named data and associated information.

Thus, in some embodiments, the present invention provides systems and methods for resolving ambiguity between names and entities through use of an information architecture comprising the steps of: a) providing a plurality of names; b) assigning at least one persistent, uniquely identified, addressable information object to each of said names; and c) storing said at least one information object associated with each name in an electronically accessible network to generate an information structure. In preferred embodiments, the names comprise biological names, including, but not limited to taxonomic names, molecule names, gene names, protein names, and cell names. In some embodiments, a content identifier is used to address the information object (e.g., those described above).

In some embodiments, the information architecture is accessible over an electronic communication network. For example, in some embodiments, the addressing of the information objects and accessing the information objects is managed by one or more resolution servers or redirection service. In some preferred embodiments, the content identifiers are managed by a registration agency (e.g., to maintain standards).

In some embodiments, the information objects comprise metadata (e.g., representing at least one of a biological Name, Taxon, Nomos, Practitioner, or Exemplar). In some embodiments, the metadata is based on phylogenetic, phenotypic, genotypic, phenetic, genomic, or polyphasic grouping of Exemplars and/or Taxa.

In some embodiments, the method further comprises the step of providing a processor configured to provide service software to users accessing the information architecture. In some embodiments, the service software is configured to route the users to third party information resources having information related to the information object. In some embodiments, the third party information resources comprise historical and current taxonomic and nomenclatural revisions of the information objects.

The present invention also provides a method for providing taxonomic and nomenclatural services, comprising: a) providing biological information objects; b) creating Digital Object Identifiers for the information objects; c) making the Digital Object Identifiers accessible in a network; and d) routing users and applications, the routing comprising linking to third party resources via a menu delivered to the user via a global DOI directory whenever the user selects a DOI-based hyperlink, to multiple services related to the biological information objects, the multiple services comprising direct and persistent links to a record of historical and current taxonomic and nomenclatural revisions of the biological information objects.

DEFINITIONS

Figure 1:
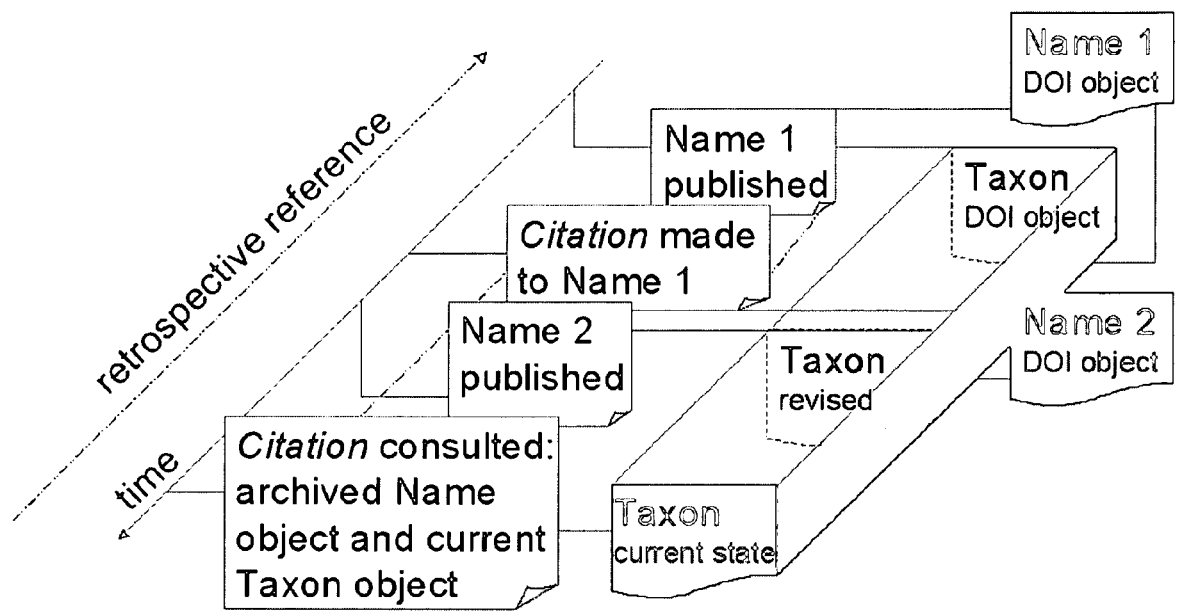
FIG. 1 shows a schematic of a DOI-based citation in an article pointing the reader to a revision of the Taxon that took place following publication of the article being cited.

To facilitate an understanding of the present invention, a number of terms and phrases are defined below:

"Names for Life" (N4L) refers to an application of an information architecture in some embodiments of the present invention to disambiguate scientific names and taxonomic opinions, wherein ambiguity in the meaning and context of scientific names and taxonomic opinions is resolved through the separation and association of the following entity types: Name, Taxon, Nomos, Practitioner, and Exemplar. Relations between Names are resolved through analysis of naming Events. A naming Event is a kind of nomenclatural event (there are other kinds) that names a Taxon and optionally modifies the status of a name created in a previous event. Where a nomenclatural event refers directly or indirectly to a previous event, the event points to the previous event and corresponding information objects. Referring events include: emended naming, the naming of a junior synonym that changes the synonym type of the name referred to, and all non-naming events. Naming events may be used as the basis for the schema of a database or an XML/SGML repository.

In the application, the entities are represented by means of persistent, uniquely identified, addressable, structured documents, referred to as "information objects."

In the application, information objects are used in the construction of nomenclatural and taxonomic "services."

Entity Types:

N4L entities are entities that exist in the physical or constructed world.

A "Practitioner" is a scientist or other person who asserts a taxonomic opinion. In some embodiments, the information object or other associated information associated with a Practitioner contains a reliability score computed from other information objects that accounts for historic performance of the Practitioner.

An "Exemplar" is a curated whole or partial organism, or a representation thereof.

A "Taxon" is a group of one or more Exemplars or a group of one or more subordinate Taxa that are circumscribed by a Practioner according to a Nomos. Exemplars and subordinate Taxa can belong to more than one Taxon simultaneously, as long as the Taxa they belong to are revealed by different Nomoi.

A "Nomos" is a methodology (heuristics, algorithms or principles) used by a Practitioner to interpret data and to reveal and circumscribe Taxa. In the preferred embodiment, 16S sequence analysis forms the basis of a Nomos. In some embodiments, phylogenetic, phenotypic, genotypic, phenetic, genomic or polyphasic approaches form the basis of multiple Nomoi. As sequence data accumulates for multiple loci, taxonomic methodologies will become differentiated, and Nomoi will provide a means of formal distinction.

A "Name" is a record of an event, by means of a dated publication, in which a Practitioner circumscribes a Taxon. In the preferred embodiment, a Name is 'new', 'emended', or 'combined'. Names have properties that can be modified by later events.

In a preferred embodiment, "Name" refers to an archived bibliographic record, which links to two other objects: a Taxon object and a publication object. For an Emended Name or a Combined Name, links are made both to the current state of the Taxon and to the Taxon as it was when the name was a New Name. Once a Name is recorded, it will persist unchanged, but for its synonym type. An example structure for the Name information object is shown in Example 1, Table 3.

An Annotation is a published comment on a Name or a Nomos or a previous Annotation that is authored by a Practitioner.

Information Objects: Structure

Information objects are virtual representations of entities; they may comprise descriptive text, metadata, and data. Tables 1-5 in Example 1, below, indicate a version of the information structure to be used in a preferred embodiment. Each information object has a persistent, unique identifier and is directly addressable.

N4L enables new types of publishing. Until N4L and the other systems and methods of the present invention, persistent resolution systems have answered the need of users to access material whose publication type predates the resolution system (journals, books, reports). N4L is unique in publishing and informatics in that it creates a new type of publication that is only made possible by a guarantee of persistent resolution. N4L entities are not represented per se in any other publishing medium. A journal article in which a Name is asserted, while it may have a DOI, is structured not in order to reflect its contribution to taxonomy but simply as a contribution within a serial publication. N4L deconstructs the publication of taxonomic research in order to make each entity addressable through its corresponding information object.

For example, a journal article may describe a methodology, assert one or more Names, and associate each Name with a Taxon. None of these entities is structured so that it can be separately referenced. Another journal article may emend or combine the Names, using the same or a different methodology, with reference to the same exemplars or to exemplars that may or may not be equivalent. Without N4L, detailed comparison of the two articles would require at least a close reading of the text and probably further research. Comparison of the two articles as mediated through N4L would enable initial research to be partially automated via Services that reason over the Information Objects: do the Names point to Taxa that cite the same Nomos? Has a Name in one article been declared a synonym of a Name in the other? Are the same or equivalent exemplars used in the two cases?

Existing publishing and informatics activity makes available the discursive material of traditional academic publishing, and raw data, as deposited in publicly accessible databases. There are many secondary services that facilitate access to online literature and data, but they are only intermediary enablers. N4L provides a semantic layer that represents intellectual constructs that are not reified elsewhere. The structure of N4L information objects allows for more highly developed forms of structured publishing. In some embodiments the information objects are largely symbolic; they stand for entities whose substance is elsewhere. In other embodiments, the information objects for Names and Nomoi (constructed entities) are the publications of record.

Services: Description
Reasoning Over Information Objects

In preferred embodiments, N4L information objects are structured and interlinked. It is therefore possible to build services based on preset queries. Such services can retrieve and display information from N4L objects, and also use information drawn from N4L objects to link to other resources on the Internet.

Illustrative examples include, but are not limited to:
Determine whether this Taxon has been revised since its inception.
Determine whether this Exemplar belongs to more than one Taxon
List all crosstaxa for this Taxon (the relative term 'crosstaxon' is used to mean a Taxon with contents in common with the current Taxon. Crosstaxa by definition have different Nomoi).
Determine whether this Name has become a synonym.
In some embodiments, an equality test is used to research a higher Taxon lacking formal emendation: For a given Name: a) Get the contents of this Taxon at the time of the Naming event (its circumscription); b) Get the current contents of this Taxon; and c) Determine whether the contents of the Taxon have changed since it was last named.
Look up this Name and all of its synonyms in PubMed or similar databases
Using locally set parameters, look up all current members of this Taxon in the catalog of the user's library
Get the journal article in which this Name is asserted
Discover gene and/or genome sequences deposited for Exemplars contained in this Taxon Accessing Information Objects and Services Since N4L objects are directly addressable, they can be visited like any other web page. While, in some embodiments, there is an N4L website, which can be browsed and searched, N4L is not fundamentally a portal but an information layer. Information objects and services derived from them can be accessed from within other Internet resources such as those provided by publishers, culture collections, herbaria, museums, and biological databases. Traffic from and to other Internet resources provides a means for generating revenue from the services.

Implementing Services

In some embodiments, services are implemented using standard technology, including DOI multiple resolution in a preferred embodiment and web services in some embodiments. In a preferred embodiment, resolution of a persistent identifier to services results in the rendering of graphical objects in the user interface, enabling the user to select and execute the chosen service. Graphical objects include text-based dropdown menus and pop-up windows, and interactive graphs (e.g., 2D, 3D, and multidimentional plots, tree graphs) containing active regions that respond to user behavior (e.g., the rollover of a mouse) by offering or executing services.

Service Functions

N4L services enable prospective survey of Names and Taxa: a reference to an N4L object enables the retrieval not only of information that was current when the reference was made, but also of information updates made since then. N4L considers a Name to be a label on an archived event in the time continuum, and hence as an index to all related events.

N4L services enable detailed comparative analysis. The reification of Nomos as an object distinct from the Taxa it reveals, forces the separation of crosstaxa, thereby clarifying differing taxonomic opinions. Revision of an existing Taxon as a result of new data is distinct from assertion of a Taxon that is different from an existing one, though overlapping. The former case is a comparison of two states of the same Taxon. The latter case is a comparison of two heteronomic Taxa (Taxa from different Nomoi). Tools for taxonomic comparison (e.g., those provided by the present invention) become increasingly important as taxonomic methodology increases in complexity and becomes more differentiated. No other bioinformnatics initiative is positioned to enable these functions.

Ancillary Structures and Technology
Codes of Nomenclature

In biology, taxonomic Names are uniquely identified, via the Codes of Nomenclature, at least within the fields of botany, zoology, prokaryotic biology and virology. In the N4L architecture, a Name designates a Taxon as understood by a Practioner according to discrete Nomos at a discrete point in time.

Collection Description

Biological taxonomies are grounded in the typological concept. For each formally named taxon, there exists one Exemplar or more (one Exemplar is designated the type, the holotype, or the lectotype), which serves as the principal reference object against which Practitioners make their comparisons. Exemplars are held in various collections and said collections may be housed in museums, herbaria, botanical or zoological gardens, academic institutions, culture collections or biological resource centers. The form of Exemplars is governed by the different Codes of Nomenclature, varies by discipline and may be either preserved or live, whole organisms, parts of whole organisms or pictorial representations. Sequences of one or more genes or entire genomes of Exemplars may serve as supporting data and may, in the future, constitute an alternative form. Each Exemplar (type specimen) is uniquely identified with one or more collection identifiers (e.g., accession number) as well as by those identifiers ascribed to the material by the Practitioner, prior to deposit in the said collection(s). The citation of these identifiers in formal taxonomic descriptions is governed by the applicable Code and provides a means by which Practitioners may locate and retrieve Exemplars. In N4L, Exemplars may be a assigned a unique and persistent identifier, either individually, or as an assemblage when Exemplars of the same organism are deposited in multiple collections. Exemplars are represented by information objects that record their relationships with each other, with other N4L information objects, and with other information resources. Referencing Exemplars by means of N4L alleviates much of the current ambiguity associated with determining equivalency and availability of such materials.

Resolution Systems

In the scientific, informatics, and publishing communities, resolution software and services are used to provide persistent access to (especially) distributed resources. Resolution systems that find use in an embodiment of N4L are typically URIs, and include Handles and URNs. Digital Object Identifiers, an implementation of Handle, and Life Science Identifiers an implementation of URN, are both good examples. ARKs and Persistent URLs are other resolution systems. More than one type of persistent identifier/resolution system could be used in an implementation of N4L, depending on the type of entity being represented by the information object.

General Definitions

As used herein, the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video discs (DVD), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the term "encode" refers to the process of converting one type of information or signal into a different type of information or signal to, for example, facilitate the transmission and/or interpretability of the information or signal. For example, image files can be converted into (i.e., encoded into) electrical or digital information. Likewise, light patterns can be converted into electrical or digital information that provides an encoded video capture of the light patterns.

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that serves informational content over a network using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language that is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "HTTP" refers to HyperText Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator that is a unique address that fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "in electronic communication" refers to electrical devices (e.g., computers, processors, etc.) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein, the term "transmitting" refers to the movement of information (e.g., data) from one location to another (e.g., from one device to another) using any suitable means.

As used herein, the term "XML" refers to Extensible Markup Language, an application profile that, like HTML, is based on SGML. XML differs from HTML in that: information providers can define new tag and attribute names at will; document structures can be nested to any level of complexity; any XML document can contain an optional description of its grammar for use by applications that need to perform structural validation. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure, to define constraints on the logical structure and to support the use of predefined storage units. A software module called an XML processor is used to read XML documents and provide access to their content and structure.

DETAILED DESCRIPTION OF THE INVENTION

The present invention provides systems and methods that utilize an information architecture for disambiguating scientific names and other classification labels and the entities to which those names are applied, as well as a means of accessing data on those entities in a networked environment using persistent, unique identifiers. While much of the present invention is illustrated using biological taxonomy examples, the present invention is not limited to these preferred embodiments.

For example, the present invention provides a method for accessing information and data in systems that classify data, using unique, persistent identifiers in order to relate diachronic constructs with synchronic constructs, which are represented by information objects. An example of such a system is biological taxonomy, in which there is a tension between a taxon and the sequence of names assigned to it.

To the casual observer, it seems inconceivable that naming a species or higher taxon has any more significance than identifying a personal achievement or staking a claim to a territory of research interest, akin to carving one's initials into the tree of life. However, this simple act has potentially far-reaching and long-lived consequences. Most contemporary biologists are not engaged in the field of systematic biology (e.g. organismal classification and identification) and have little occasion to propose names for new species or higher taxa. Rather, they are end-users of the classifications and nomenclature produced by specialists. Most biologists seem unaware that separate Codes of Nomenclature (Sneath 1992; Greuter, Hawksworth et al. 1998; Cantino and de Queiroz 2000; Greuter 2000; Buchen-Osmond 2002) exist that provide legalistic frameworks governing the formation and assignment of names to species and higher taxa, circumscription and emendation of those taxa, priority and citation, synonymy and homonymy, correction of orthographic errors and adjudication of disputes in nomenclature. The Codes do not, however, govern classification or identification. Most biologists also seem unaware that taxonomic proposals differ from other types of research publications and have permanent standing in the literature (Minelli 2003), yet are no more than expert opinions, subject to acceptance or rejection by the larger community.

Biological names have some properties that are not intuitive. Once a name is published, it is fixed in both time and scope and may or may not be revised when new information becomes available. When taxonomic revisions do occur, authors frequently fail to address synonymies or to formally emend the descriptions of all of the higher taxa that are affected. While the Codes guarantee persistence of a validly published name, the serial, cumulative nature of publication allows the name to obsolesce in relation to the taxon it originally denoted. In contrast, the taxon persists, and the granularity with which it is defined increases over time. The published name provides an archival record of taxonomic definition only for a single point in time, the date of publication.

This disjunction of nomenclature and taxonomy leads to an accumulation of dubious names in the literature and databases. While systematic biologists may recognize such problems, most others, including the curators of some databases, do not. This can have a significant impact on activities such as assertions of taxonomic identity, commonality of metabolic function, and recognition of homologous, paralogous or xenologous genes. It can also have significant and unintended consequences such as adding or removing species to lists of tightly regulated species (e.g., the current list of biothreat agents).

The Codes of Nomenclature require that proposals and emendations of names be formally published in printed form. Taxonomy is cumulative; it derives from a collection of documents published over time. While printed documents can cite only their predecessors, they cannot point forward to their emendations. Therefore, formal taxonomy today is retrospective.

Taxonomy increasingly relies on molecular methods, which depend on data that are required to be made public. However, printed documents cannot conveniently reference online data.

Formal publication online is made possible by the technical and professional infrastructure being built by the Digital Object Identifier Foundation. Digital Object Identifiers (DOIs) ((Paskin 2002; Paskin 2003; Paskin 2003)) provide persistent identification of online information objects and other managed metadata. They are used for various classes of publication, but most currently registered DOIs identify articles in scientific journals.

The present invention provides methods for implementation of DOIs or other identifiers to serve as a robust and future-proof solution to the aforementioned problems in taxonomic classification. A DOI is a unique, persistent identifier of an information resource that is registered together with a URL. Its purpose is the management and retrieval of that resource in the network environment. For example, though the definition of a taxon may be refined and its nomenclature redefined, the DOI will persist, leaving a forward-pointing trail that can be used to reliably locate digital and physical resources, even when a name may be deemed obsolete.

Taxonomic development, as an information system that diverges over time from nomenclature, and that varies according to methodology, needs to be managed as an intellectual construct that is in accordance with, but independent of, the respective Code of Nomenclature. A prerequisite for coordinating Taxonomy and Nomenclature is an information model in which they are integrated. The present invention provides, for example, the Names-for-Life information model, the foundation of which is built upon specific Nomenclatural events as described herein (See Example 1, Table 1).

Accordingly, in some embodiments, the present invention provides a method for classifying biological taxa, using biological information objects (e.g., See Example 1, Table 2), creating content identifiers for the information objects, and making the content identifiers accessible in a network environment.

In some embodiments, the biological Taxon objects exist without being pointed to by the biological Name objects, and the biological Taxon identifier exists as a foreign key in the biological Name record.

Relationship of Names, Exemplars, and Sequences to Other Biological and Data Resources Within biology, the fundamental taxonomic unit is the species. However, species can be further subdivided into subspecies, varieties and other categories that are specific to the disciplines of botany, zoology, prokaryotic biology and virology. In a preferred embodiment of the present invention, information architectures are utilized to improve management of information pertaining to species within, for example, the Domains Bacteria and Archaea, which are collectively referred to as prokaryotes.

Figure 3A:
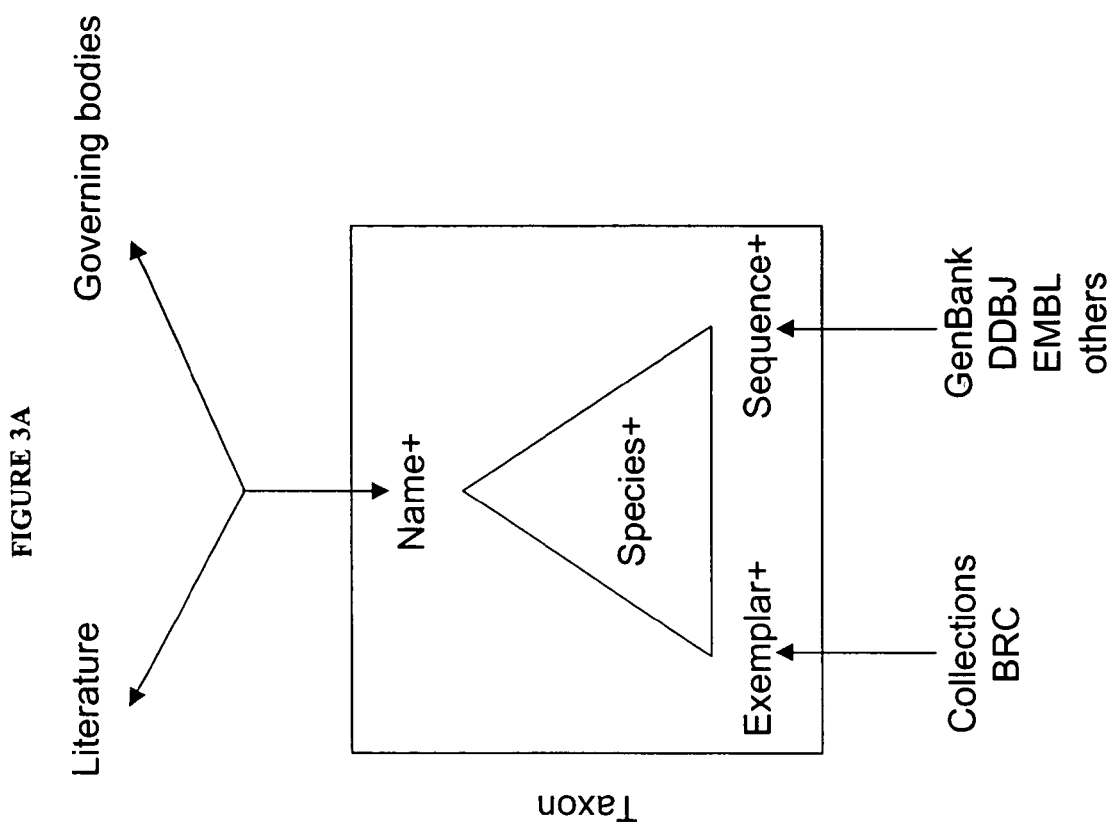
FIGS. 3A-D provide schematics illustrating certain preferred embodiments of the present invention.

FIG. 3A provides a schematic of the relationship of names, exemplars, and sequences. In accordance with the codes of nomenclature, each species will bear at least one Name, in the form of a Latinized binomial comprising a genus name and a species epithet, which when combined, are unique. In a preferred embodiment, at least one viable Exemplar is available to the community from a publicly accessible culture collection or biological resource center. By contemporary convention, at least one full-length 16S rRNA gene sequence is also acquired for each new species and said sequence is deposited in one of the public data bases (e.g., GenBank, EMBL, DDBJ) and is used to determine the evolutionary lineage(s) to which the new species is most closely related. This also allows placing the species into a genus and successively higher taxa. Both Exemplars and Sequences are assigned alphanumeric identifiers when accessioned to permit retrieval. Taxonomic names are also frequently included, but may not be valid or legitimate and are rarely updated. Moreover, Names are rarely cross-linked with synonyms or other available data or to the relevant literature.

Complex Relationships Among Names, Exemplars, Sequences and Taxa

Figure 3B:
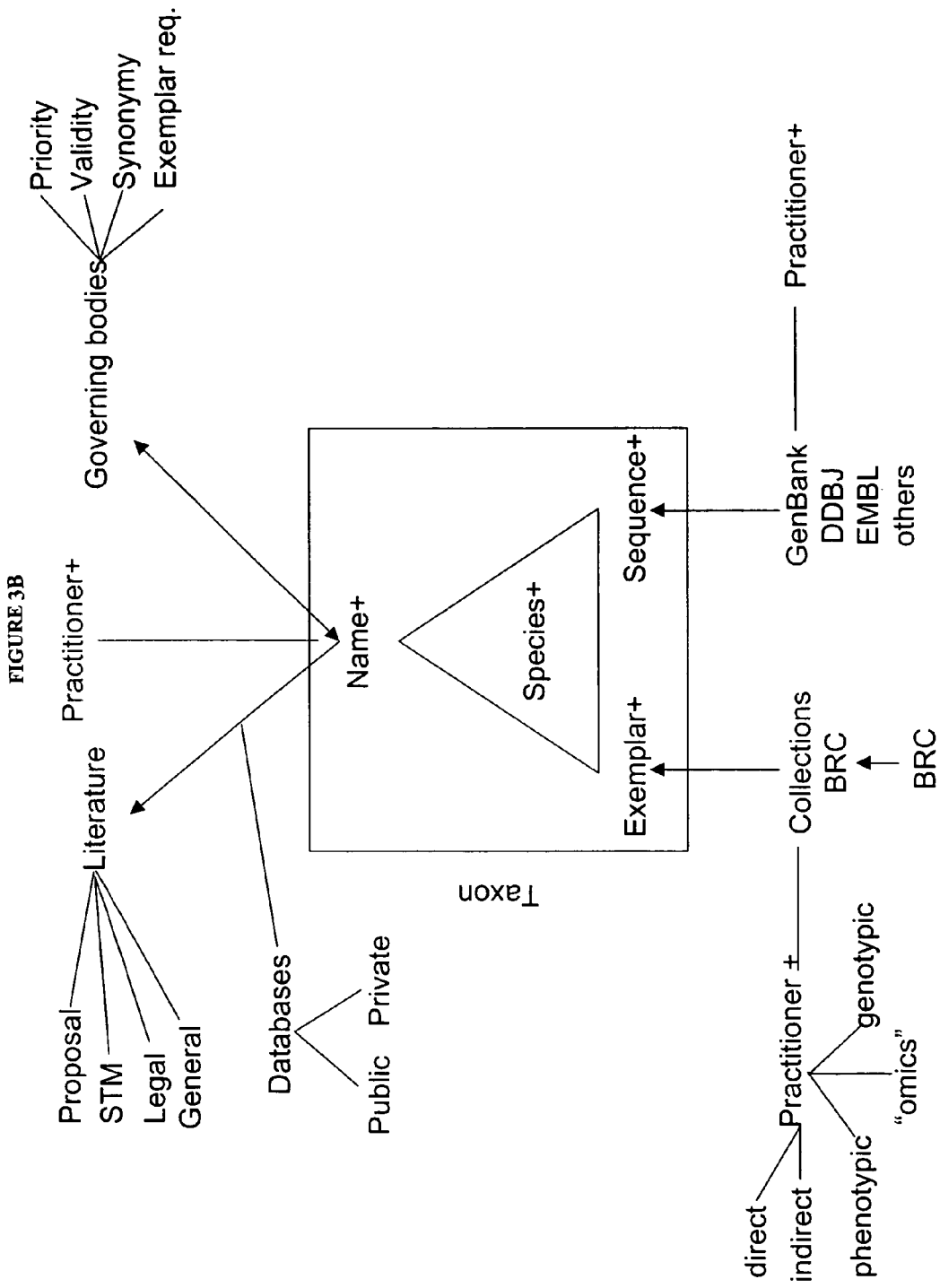

FIG. 3B provides a schematic of the relationship of Names, Taxa, and Exemplars with Practitioners. The relationship between Practitioners and collections is complex, as Practitioners may both deposit and withdraw materials from these agencies as part of their routine work. In addition to raw and analyzed sequence data, Practitioners collect many other types of descriptive data. These data are the product of the various Nomoi applied by individual Practitioners and are frequently based upon generally accepted standards by their respective scientific communities. Exemplars may be derived from nature as part of the ongoing research activities of Practitioners, or may be exchanged amongst Practitioners. Collections may also exchange Exemplars as part of their normal business activity.

Unlike most other categories of data, centralized public databases are available for protein and nucleic acid sequence data. Practitioners routinely interact with such databases.

Formal proposal of a Name is an essential part of taxonomic circumscription, and the responsibility of each Practitioner. The formation and application of names is governed by the various Codes of Nomenclature, and must abide by these rules to be deemed legitimate, valid and have standing in the literature. To ensure permanence, nomenclatural acts are recorded in print, therefore (taxonomic literature has strong parallels with the legal literature). Names also play a critical role in many other disciplines in science, technology, medicine, and law.

Biological names also figure prominently in the general press and in numerous public and private databases (e.g. as used in clinical microbiology and epidemiology, quality control, etc.) as a means of accessing and conveying information.

Incomplete States of the NTN Model

Figure 3C:
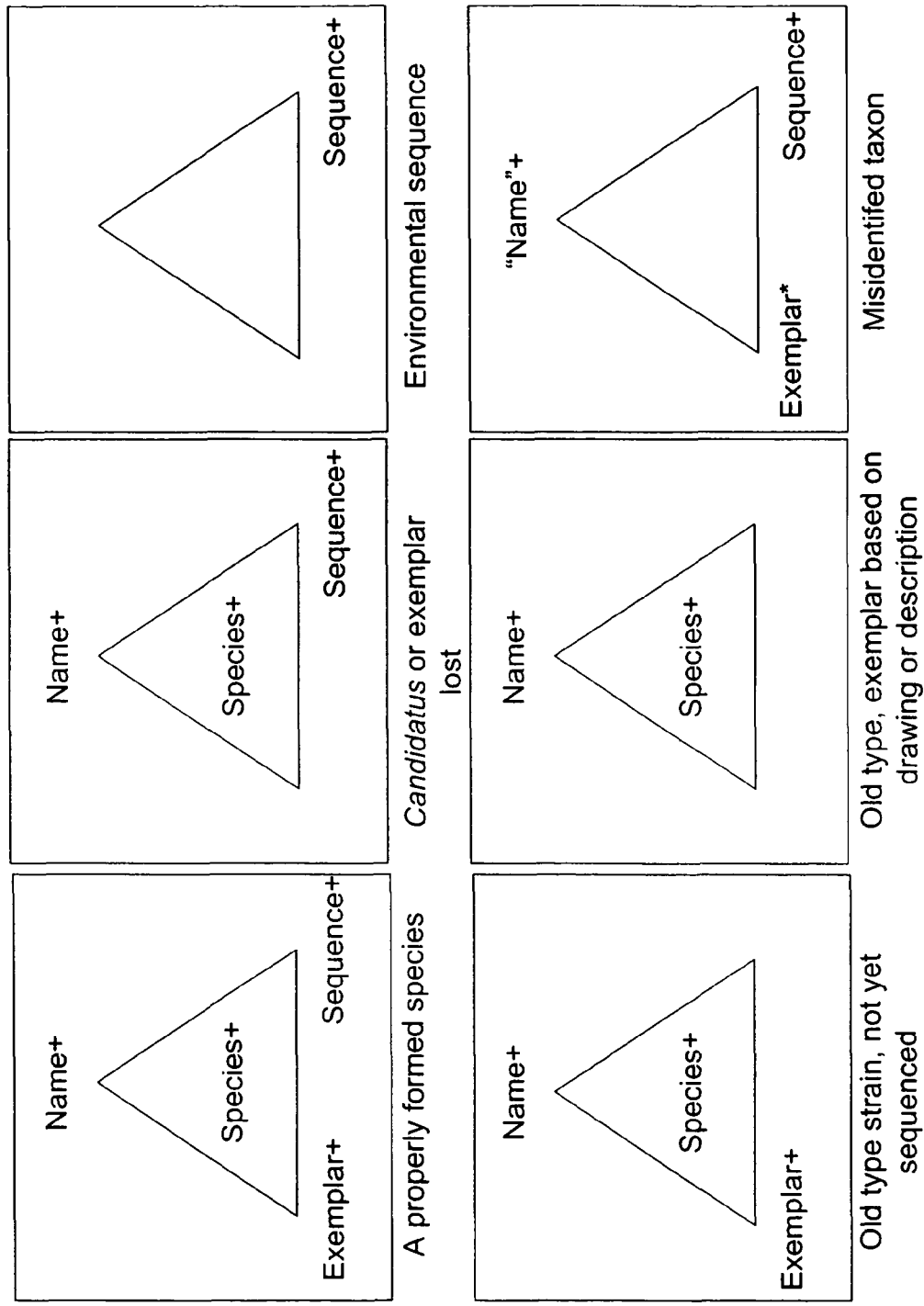

There are a number of instances in which incomplete states of the NTN model are known to exist. FIG. 3C describes a number of these.

Absent Exemplar I

In prokaryotic biology (a preferred example), current practice requires multiple viable Exemplars be deposited for a species to be deemed validly named. This precludes not-yet-cultivated species from having standing in the nomenclature. The amended Code does, however, provide Candidatus status for those taxa that can be conclusively proven to exist (e.g. by sequence data), but that cannot be cultivated.

Absent Exemplar II

An analogous situation occurs when sequence data is available for a validly named species, but for which the Exemplar has been lost. The opposite situation may also exist, in which a validly named species exists, but for which sequence data has not yet been collected or made publicly available.

Inconsistent Name

A third example of an incomplete or imperfect NTN model may exist when a Sequence and Exemplar exists for a given species, but the Name ascribed to the species is inconsistent with the data. Such a situation typically exists when a synonymy occurs and may lead to a reclassification of the species. However, if the name was validly published, it still has standing in the nomenclature. This situation also exists for numerous wild-type isolates that are simply misidentified by Practitioners.

Name and Exemplar Absent

There are also two single-state conditions that may occur. The most frequent condition arises from the use of PCR to amplify 16S rRNA genes from DNA extracted from the environment. At present >20,000 such sequences exist in the public databases and are routinely reported by BLAST and other sequence similarity algorithms.

Absent Exemplar III

There also exist validly named species for which neither viable Exemplars exist nor for which sequence data has been generated. Such cases are exemplified by species for which a drawing, photograph or written description currently serves as the type.

The N4L/Bergamot Middle Layer

Figure 3D:
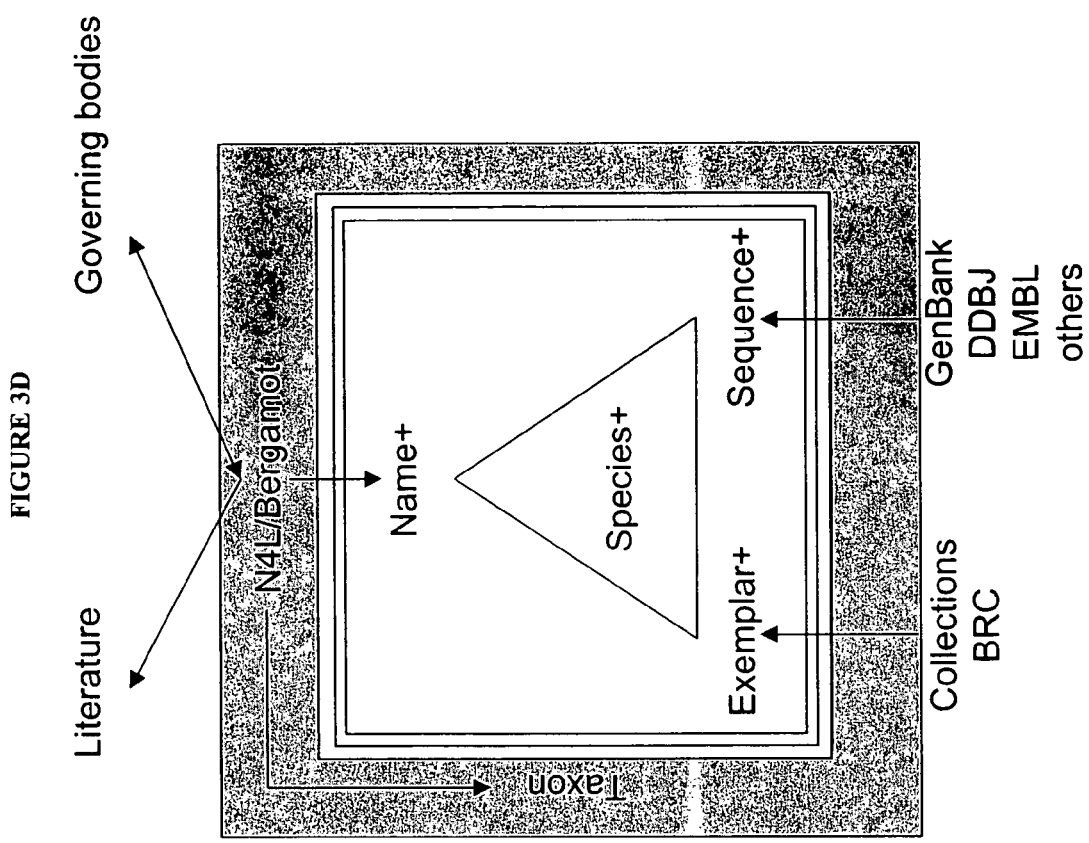

FIG. 3D shows how embodiments of the present invention provide an information layer that links Names and Taxa. The N4L/Bergamot model and information objects of the present invention provide a transparent middle layer that permanently links together Names and Taxa (at all levels of the hierarchy) with their occurrences in the literature and data repositories. Through the use of DOIs and multiple resolution technology, Names can serve as future-proof links to the complete taxonomic record of a given taxon (including relevant information regarding synonymies, orthographic errors, priority, etc.) and to a variety of third-party services specific to a given taxon without the intervention of search engines or other methods. End-users simply need to click on a name or other similar graphic device to gain access to the desired information.

EXPERIMENTAL

The following examples are provided in order to demonstrate and further illustrate certain preferred embodiments and aspects of the present invention and are not to be construed as limiting the scope thereof.

Example 1

Bergey's Accumulative Online Taxonomy (Bergamot)

Digital Object Identifiers explained. While the DOI identifies an information resource of any type (not necessarily digital; it could be a printed book), it typically resolves to a web page, which provides basic metadata about the information resource. That web page is an example of a DOI response page.

A DOI is registered together with the URL representing the identified resource. Hence, the identifier is separate from the location of a resource. In fact, the same resource may be retrievable from more than one location.

Example: Finneran et al. recently published a proposal for a new species of *Rhodoferax* capable of dissimaltory Fe(III) reduction, *Rhodoferax ferrireducens*. The proposal appears in the Int. J. System. Evol. Microbiol. 53: 669 and has the following DOI: 10.1099/ijs.0.02298-0.

10.1099 is the prefix, which identifies Society for General Microbiology as the naming authority;

ijs.0.02298-0 is the suffix, which, while it may have meaning within the Society for General Microbiology, is opaque within the DOI system. All that is required is that publisher make it unique.

A DOI resolves to a URL as an argument to the resolver located at dx.doi.org. Hence, a DOI-based linking application appends the DOI to the address of the resolver:

dx.doi.org/10.1099/ijs.0.02298-0

The resolver looks up the DOI and redirects the user to the URL that was paired with it, in this case:

ijs.sgmjournals.org/cgi/content/abstract/53/3/669

Any citation of this article can be referenced by its DOI, and any web application that displays that citation can link to the article online. The DOI and its resolution can be completely hidden from the user. The user simply clicks on a link in a web page and goes to the target URL, as for any other link (except that '404 Not Found' is a most unlikely result).

The Bergamot project exists to facilitate consensual description and resolution standards in prokaryotic systematics, nomenclature, and bioinformatics in a networked environment. Presently, the scope is limited to prokaryotic taxa, covered in current and future versions of The Outline of Prokaryotic Taxa ((Garrity, Winters et al. 2001; Garrity, Johnson et al. 2002; Garrity, Winters et al. 2002; Garrity, Bell et al. 2003)). Bergamot provides a means of traversing the taxonomic and nomenclatural record, backwards and forwards in time, and across differing points of view in a transparent way. The name of each species, genus, or higher taxon, whether in print or in electronic form, becomes an entry point into Bergamot, with access being mediated by a single, well understood methodology. Nomenclature is viewed as a sequence of Code-compliant publications, in which there occur discrete, archivable events, whereas Taxonomy is viewed as a network, dynamic, and constantly maintained.

Table 1 presents an analysis of nomenclatural events. The Bergamot information objects are presented in Table 2. Name objects are summarized in Table 3. Taxon objects are summarized in Table 4. Nomos objects are summarized in Table 5.

TABLE 1

Nomenclatural events

| EventType Naming | LocationPointer publicationRef | Attributes NameType | new emended combined | EventPointer | Comments |
|---|---|---|---|---|---|
| | | SynType | none | none | |
| | | | senior heterotypic | none | current |
| | | | junior heterotypic | namingRef | deprecated; points to the senior synonym |
| | | | senior homotypic basonym | none | usually results from a new combination: deprecated |
| | | | junior homotypic intentional | namingRef | junior to a basonym: combined name; current; points to the senior synonym |
| | | | senior homotypic coincidental | none | implied by strain equivalence: current |
| | | | junior homotypic coincidental | namingRef | implied by strain equivalence: deprecated; points to the senior synonym |
| AOS (assertion of synonymy) | publicationRef | Syntypes (2 or more values) | (taken from Syntype values above) | namingRefs (2 or more values) | |
| RFO (request for an opinion) | publicationRef | RequestType | challenge advocacy | namingRef | points to naming event about which an opinion is requested |

TABLE 1-continued

Nomenclatural events

| EventType Naming | LocationPointer publicationRef | Attributes NameType | new emended combined | EventPointer | Comments |
|---|---|---|---|---|---|
| Opinion | publicationRef | OpinionType | rejection conservation | rfoRef namingRef | points to the RFO being addressed and to the naming event about which an opinion was requested |

TABLE 2

The Bergamot information model

| Project phase | Information Object | Description | Organizing Principle |
|---|---|---|---|
| Initial | Publication | Typically, information about a publication that contains one or more nomenclatural events | Publication objects are dictated by custom and practice in scientific publishing, largely through the CrossRef consortium[XREF]. Publication objects are not part of the Bergamot application. For Electronic publications that have a DOI (virtually all contemporary scientific publications) The DOI response page provides the information object: perhaps the publication itself but more often a bibliographic record and pointer to the full text |
| | Name | Information about a New, Emended, or Combined Name. A Name object points to the Taxon object being named and to the Publication object representing the publication in which the naming event took place. Note that when a name is emended, an information object is created, representing the emended name. The original information object, for what was the original New Name remains as a separate information object. | Name objects represent names that are valid according to the Code of Nomenclature. They are classified according to the nomenclatural events model. |
| | Taxon | Information about a Taxon in its current and previous states. A Taxon object links to its current and previous Names and to its Nomos. Further details are in Table 3. | Nomos |
| | Nomos | A Nomos object links to Publication objects in which the Nomos is presented, and provides information about the Taxonomy that the Nomos creates. Further details are in Table 4. | Nomos is a representation of the criteria or methodology that a Practitioner uses to construct a taxonomy. |

TABLE 2-continued

The Bergamot information model

| Project phase | Information Object | Description | Organizing Principle |
|---|---|---|---|
| Subsequent | Exemplar | An Exemplar object represents one or more authoritative records of a preserved organism in a recognized culture collection. Organism objects will link to Taxon objects. | Information integration across collections is under consideration outside the Bergamot project. Information objects, sensu Bergamot, would be useful for Bergamot services and more generally. |
| | Practitioner | A Practitioner object would represent the name and contact and affiliation information of a worker who contributes to nomenclature and taxonomy. It will link to any other object. | We envisage that links from a Practitioner to the objects published by that practitioner could provide useful links and paths through the information, particularly in conjunction with Annotation objects. |
| | Annotation | An Annotation object will represent a practioner's comments regarding another information object, to which the Annotation object links. Annotation objects will allow practitioners to comment on (and link to) other Names, Taxa, and Nomoi, via their information objects | Annotation comments may be contained within the information object itself, or within a traditional publication, which is linked to from the Annotation (information) object. As first-class objects within Bergamot, Annotations will allow published discussion to be represented, not just nomenclatural events. For example, a Taxon object could link, via an Annotation, to a publication in which it is discussed. Annotations will allow the published record to become a network of classified links, distinguished according to their nomenclatural and taxonomic role. |

TABLE 3

The Name information object

| Taxon element | Description |
|---|---|
| nameType | Has a fixed value: New or Combined or Emended |
| nameLabel | Formal citation of the Name in accordance with the Code of Nomenclature |
| nameDate | Date of publication in which the Naming event happens |
| publicationRef | Contains a pointer to the publication in which the Naming event happens |
| taxonRef | Contains pointer(s) to the Bergamot Taxon object associated with this Name. (They can point to historical or current state of the Taxon.) |
| synonymType | Has a fixed value: one of the synType values in Table 1 Nomenclatural events Has two subelements: |
| | synonymTypeDate — Contains the date that the current synonym type was assigned |
| | nameRef — Optional; contains a pointer to the Name object of a prior Name (whether there is nameRef is determined by the synonymType) |

TABLE 4

The Taxon information object

| Taxon element | Description |
|---|---|
| nameRef(s) | contains pointer(s) to the Bergamot Name object(s) associated with this Taxon: for the 'current' Name, plus any others that apply. |
| sequenceRef(s) | For species Taxa; contains pointer(s) to sequence deposit(s) in networked databases. |

TABLE 4-continued

The Taxon information object

| Taxon element | Description |
| --- | --- |
| organismRef(s) | For species Taxa; contains pointer(s) to strain deposit(s) that are represented in networked databases. |
| isPartOf | Contains a specialized taxonRef to the Bergamot object representing the Taxon that contains this Taxon. |
| hasContents | Contains one or more specialized taxonRefs to the Bergamot objects representing the Taxa contained in this Taxa. |
| nomosRef | Contains a pointer to the Nomos object that represents the Nomos that provides the circumscription criteria for this Taxon. |
| hasNearestNeighbor | Contains a specialized taxonRef to the Bergamot Taxon object that is closest to this Taxon (where criteria for proximity are defined by the Nomos). |
| taxonHistory | Structured information which provides previous states of the Taxon with regard to Contained-by, Contains, Nearest-neighbor. |

TABLE 5

The Nomos Object

| Nomos element | Description |
| --- | --- |
| nomosLabel | Contains a short descriptive name supplied by the author of the Nomos (e.g., 'The Bergey's Taxonomy'). |
| nomosAuthor | Contains the name and affiliation of the author. (In a later phase of development this will be a practitionerRef, i.e., a pointer to a Practitioner information object.) |
| publicationRef(s) | Contains a pointer to one or more publications in which the Nomos is described |
| hasRoot | Contains a specialized taxonRef to the Bergamot Taxon object that represents the highest Taxon for which the Nomos is proposed. (We do not assume that a Nomos is always applicable to all of a biological domain. A Nomos may be particular to a subgroup of organisms, to which there apply local criteria for circumsciption.) |
| hasTaxa | Contains a count for total number of Taxon objects that cite this Nomos. |

Example 2

Multiple Resolution of DOIs

DOI based citation example. An online journal article exits in which the author cites Name 1 by its Bergamot DOI. Following publication of this article, Name 1 is deprecated by the publication of Name 2. The publication of Name 2 causes three changes in Bergamot: The object for Name 1 changes its type to 'deprecated', the Taxon object associated with it is revised, and a new object for Name 2 is created. Now, when readers consult the article and follow the DOI Name reference, they access the revised Taxon object, which shows not only the current circumscription of the Taxon, but also the circumscription as it was when cited by the author of the article (FIG. 1).

A dynamic menu offers forward links to a more recent information object. Using the IDF's multiple-resolution technology, readers of the article would see an addition to the Name citation (for example a menu displayed by mousing over it) that could warn that the Name is now deprecated and offer related services (e.g., links to the object representing the now preferred/current Name and the current state of the Taxon).

Example 3

Bergamot Model of Continuous Emended Taxonomic Information

Figure 2:
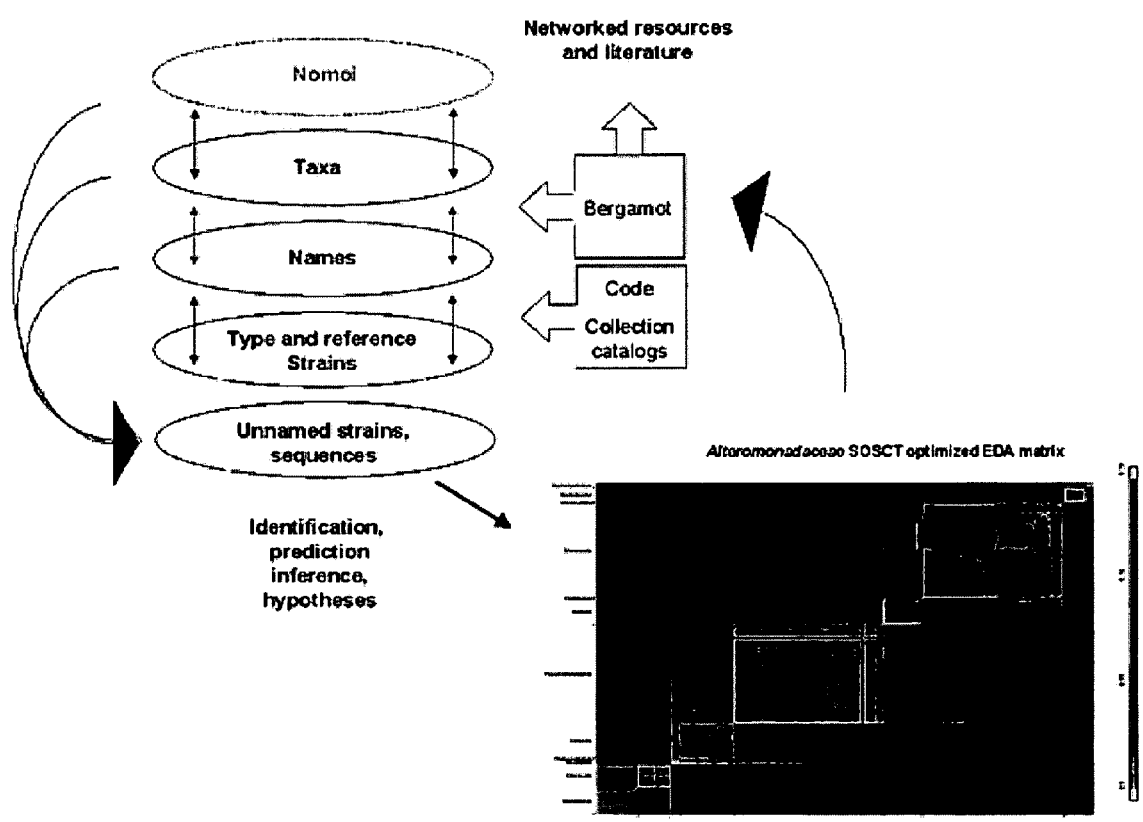
FIG. 2 represents how the Bergamot system (an implementation of the present invention) provides a source of continuously emended taxonomic information about Bacteria and Archaea.

Before DOIs, scientific publishers were hard pressed to collaborate in multiple bilateral agreements to link citations. Beyond traditional, digitized publishing mechanisms, taxonomic portal developers also need a generalized, robust linking mechanism for building nomenclatural and taxonomic information structures Bergamot provides a source of continuously emended taxonomic information. The connection between nomenclatural types (Exemplars), names and unidentified strains is strengthened through the use of routine realignments of all taxa using automated methodologies (FIG. 2). This allows for a more precise placement of unknown and/or misnamed or misplaced taxa using objective measures of taxonomic affinity. The output of such an algorithm is represented as a Bergamot Nomos and provides a means of regularly revising and updating the Bergamot system as well as the Taxonomic Outline of the Prokaryotes.

Portals integration. Bergamot is not of itself a portal. Bergamot is conceived as an information layer that indexes the scientific literature and abstracts structure from the aggregated published record. It is therefore positioned to index other information objects, in taxonomic and biodiversity portals, insofar as they are formally published. Bergamot can be used as a means to register metadata and DOIs for those objects so as to make them part of the permanent record, and make them likewise transparently addressable.

Bergamot defines information objects and publishes them with DOIs. Assignment of a DOI to an object makes it trivial to link to it permanently. There is no need for a Bergamot-specific lookup algorithm. By analogy, DOIs for scientific journal articles are managed by CrossRef, a service provided by a consortium of publishers, who collaborate to link bibliographic citations via the DOIs of the cited works. Bergamot enables direct reference to an information object from any networked resource. Bergamot is not, therefore, conceived as a web portal. Rather, it is a collection of directly and permanently addressable information objects. Just as a journal article can be directly cited, Bergamot Name objects and Taxon objects can be directly cited, with equally reliable and formal publishing metadata and web-page resolution.

Buchen-Osmond, C. (2002). ICTVdB: The Authorized Universal Virus Database, Biosphere 2 Center, Columbia University.

Cantino, P. and K. de Queiroz (2000). PhyloCode: A phlogenetic code of biological nomenclature, Produced by P D Cantino, Ohio State University.

Garrity, G. M., J. Bell, et al. (2003). Taxonomic Outline of the Procaryotes, Bergey's Manual of Systematic Bacteriology, Second Edition, Release 4.0. October, 2003, Springer-Verlag.

Garrity, G. M., K. L. Johnson, et al. (2002). Taxonomic Outline of the Procaryotes, Bergey's Manual of Systematic Bacteriology, Second Edition, Release 3.0. July, 2002, Springer-Verlag.

Garrity, G. M., M. Winters, et al. (2002). Taxonomic Outline of the Procaryotes, Bergey's Manual of Systematic Bacteriology, Second Edition, Release 2.0. January, 2002, Springer-Verlag.

Garrity, G. M., M. Winters, et al. (2001). A Taxonomic Outline of the Procaryotes, Bergey's Manual of Systematic Bacteriology, Second Edition, Springer-Verlag, NY: 320.

Greuter, W. (2000). "International code of botanical nomenclature (St. Louis Code)."
Greuter, W., D. L. Hawksworth, et al. (1998). "Draft BioCode (1997): the prospective international rules for the scientific names of organisms." *Taxon* 47(1): 127-150.
Minelli, A. (2003). "The status of taxonomic literature." *Trends in Ecology and Evolution* 18(2): 75-76.
Paskin, N. (2002). *Digital Object Identifiers*, IOS Press.
Paskin, N. (2003). The DOI® Handbook, International DOI Foundation.
Paskin, N., Ed. (2003). *DRM Technologies: Identification and Metadata*. Lecture Notes in Computer Science: Digital Rights Management: Technical, Economical, Juridical, and Political Aspects. Heidelberg, Springer-Verlag.
Skerman, V. B. D., V. McGowan, et al. (1980). "Approved lists of bacterial names." *Int. J. Syst. Bacteriol.* 30: 225-420.
Sneath, P. H. A. (1992). *Code of Nomenclature of Bacteria* (1990 *Revision*). Washington, D.C., American Society for Microbiology.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

What is claimed is:

1. A method for resolving ambiguity between names and entities through generation of an information architecture comprising the steps of:
   a) providing:
      i) an electronically accessible network,
      ii) service software,
      iii) a plurality of names for a given entity, and
      iv) a processor configured to perform the steps of:
   b) identifying an ambiguity within said plurality of names for said given entity;
   c) assigning at least one persistent, uniquely identified, addressable information object to each of said names;
   d) storing said at least one information object associated with each name in said electronically accessible network to generate an information architecture; and
   e) resolving said ambiguity by accessing said information architecture stored in said electronically accessible network via said service software.

2. The method of claim 1, wherein said names comprise biological names.

3. The method of claim 2, wherein said biological names comprise taxonomic names.

4. The method of claim 2, wherein said biological names comprise molecule names.

5. The method of claim 4, wherein said molecule names are selected from the group consisting of gene names and protein names.

6. The method of claim 2, wherein said biological names comprise cell names.

7. The method of claim 1, wherein a content identifier is used to address said information object.

8. The method of claim 7, wherein said content identifier is at least one of a Digital Object Identifier (DOI), a Uniform Resource Identifier (URI) or a Uniform Resource Name (URN), an Archival Resource Key (ARK), a Persistent Uniform Resource Locator (PURL), a Universal Unique Identifier (UUID), and a Life Sciences Identifier (LSID).

9. The method of claim 1, wherein said accessing of step e) is done by a third party over an electronic communication network.

10. The method of claim 1, wherein said accessing of step e) is managed by one or more resolution servers or redirection services.

11. The method of claim 7, wherein said content identifier is managed by a registration agency.

12. The method of claim 1, wherein the content of said information object comprises at least one of metadata, data, and descriptive text, said content representing at least one of a biological Name, Taxon, Nomos, Practitioner, or Exemplar.

13. The method of claim 12, wherein assignment of said content is based on phylogenetic, phenotypic, genotypic, phenetic, genomic, or polyphasic grouping of Exemplars and/or Taxa.

14. A system comprising a processor and software configured to carry out the method of claim 1.

15. A method for providing taxonomic and nomenclatural services, comprising:
   a) providing:
      i) biological information objects,
      ii) an electronically accessible network,
      iii) service software, and
      iv) a processor configured to perform the steps of:
   b) creating persistent identifiers for said information objects;
   c) making said persistent identifiers accessible in said network via said service software; and
   d) routing users and applications, said routing comprising the steps of:
      i) providing a menu of multiple services comprising direct and persistent links to a record of historical and current taxonomic and nomenclatural revisions of said biological information objects;
      ii) delivering said menu of multiple services to said users via a global persistent identifier directory;
      iii) identifying an ambiguity within said historical and current taxonomic and nomenclatural revision of said biological information objects;
      iv) resolving said ambiguity by selecting a persistent identifier-based hyperlink from said global persistent identifier directory; and
      v) linking to third party resources.

16. The method of claim 15, further comprising the step of generating revenue from said link to said third party resources.

17. The method of claim 9, wherein said electronic communication network provides active regions that respond to the behavior of said third party.

18. The method of claim 9, wherein said electronic communication network provides active regions that offer services to said third party.

19. The method of claim 9, wherein said electronic communication network provides active regions that route said third party to information resources related to said information objects.

20. The method of claim 19, wherein said third party information resources comprise historical and current taxonomic and nomenclatural revisions of said information objects.

21. The method of claim 17, 18 or 19 wherein said active regions generate revenue from said third party.

22. A method for resolving ambiguity between names and entities comprising the steps of:
   a) providing:
      i) an electronically accessible network,
      ii) service software,
      iii) an ambiguity comprising a first name and a second name for a given entity, each name associated with one or more objects; and
      iv) a processor configured to perform the steps of:
   b) changing the objects associated with said first name and creating one or more new objects associated with said second name, said second name accessible on said network, thereby resolving said ambiguity.

23. The method of claim 22, wherein said first and second names are taxonomic names.

24. The method of claim 22, wherein said objects are information objects that are retrievable by persistent identifiers.

25. The method of claim 24, wherein said persistent identifiers are Digital Object Identifiers.

26. The method of claim 22, wherein said first and second names are synonymous or polysemous names.

* * * * *